Nov. 12, 1929.     T. C. DEUTSCHMANN     1,735,381
CONDENSER
Filed June 12, 1926

Inventor:
Tobe C. Deutschmann
by Edward F. Allen
atty.

Patented Nov. 12, 1929

1,735,381

UNITED STATES PATENT OFFICE

TOBE C. DEUTSCHMANN, OF BOSTON, MASSACHUSETTS, ASSIGNOR TO TOBE DEUTSCHMANN CORPORATION, OF CANTON, MASSACHUSETTS, A CORPORATION OF DELAWARE

CONDENSER

Application filed June 12, 1926. Serial No. 115,503.

This invention relates to fixed condensers of a type commonly used in electrical work, and more particularly to an attachment for such condensers.

It is an object of the present invention to provide means applicable to certain condensers, whereby protection is afforded to certain portions thereof which are exposed, and to which at the present time, wires are to be connected.

It is a further object of the invention not only to provide a protective means for the delicate exposed portions of a certain type of condenser, but to afford also a substantial and durable means to which to attach wires in lieu of attaching them to the said delicate portions.

Other objects of the invention will be fully understood from a description of the drawings and the claim hereinafter given.

Of the drawings.

Like characters represent like parts throughout the several figures of the drawings.

Figure 1:
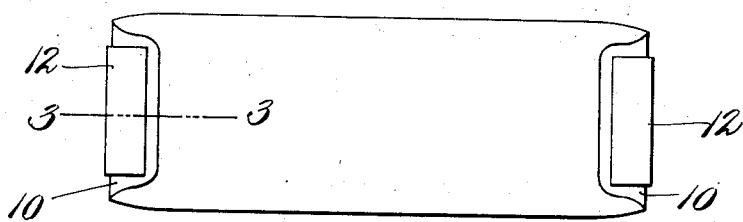
Figure 1 is a top plan view of one type of fixed condenser at present in use.
Figure 2:
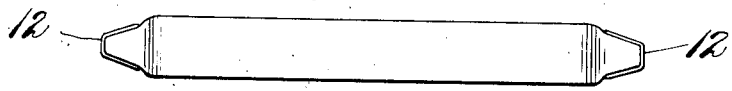
Figure 2 is a side elevation of the condenser shown in Figure 1.
Figure 3:
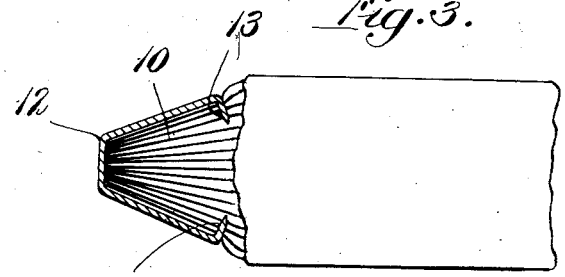
Figure 3 is an enlarged side view partly broken away and in section of one end portion of the condenser shown in Figs. 1 and 2.
Figure 4:
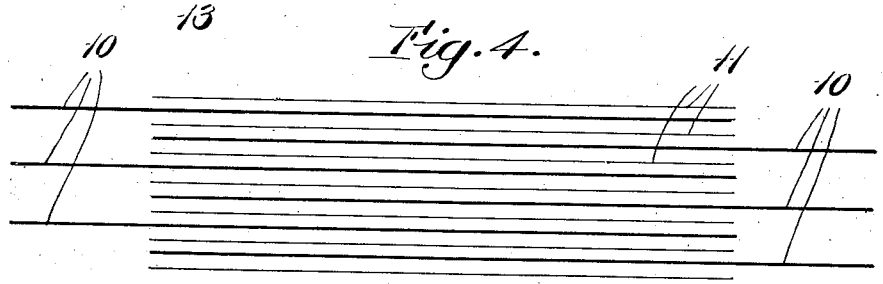
Figure 4 is a diagrammatic view illustrating the manner in which the different layers of the condenser are assembled.
Figure 5:
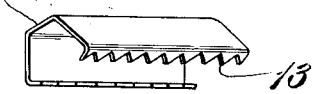
Figure 5 is a perspective view of the attachment.

Referring to the drawings:

The drawings herewith illustrate a type of electrical condenser wherein a plurality of alternately arranged ribbons or strips of tin foil or other conducting material 10 and a dielectric material 11 of one sort or another are formed into a condenser as shown in Figures 1 and 2, and has suitable insulating material enclosing the main body thereof.

In this type of condenser alternating layers of dielectric sheet material and conducting, or charge receiving, sheet material, are arranged in a stack, the dielectric layers being shorter or less in length than the layers of conducting material, and the latter consisting of two sets whereof the layers of each set alternate with and are relatively offset with respect to the layers of the other set and with respect to the layers of non-conducting or dielectric material so that at each end of the condenser one set of charge receiving layers extends beyond all of said other layers and are bunched together to form a single terminal mass.

It will be understood however that this seemingly compact mass at each end of the condenser is very delicate, and that it is not proof against rough usage but must be handled with care. Heretofore it has been necessary to solder or otherwise attach wires to these delicate ends, great care being used in doing so, and at best it was an unsatisfactory connection that was frail, and susceptible to injury if not separation if care was not used in handling.

The present invention contemplates the use of a metallic protective device 12, preferably copper, which is arranged to cover a considerable portion of the end of the condenser, and to be firmly held thereto by the teeth 13 which are arranged to be imbedded in the conducting material for a considerable distance, thus providing protection for the laminated ends, and affording a substantial medium to which to solder a wire.

Having described the invention I claim:

A condenser comprising a stack of alternating layers of conducting and non-conducting sheet material, the layers of conducting sheet material being longer than the other layers and consisting of two sets whereof the layers of each set alternate with and are relatively off-set with respect to the layers of the other set and with respect to the layers of non-conducting material so as to extend beyond all of said other layers at one end of the stack, and said projecting ends being compacted into a bunch, and a sheet metal clip embracing and gripping said bunch comprising a middle portion disposed opposite the end of the bunch and two flat jaws clamped flatwise against opposite sides of the latter, said jaws being provided at their free ends with parallel inwardly bent serrated edge portions providing two opposed parallel rows of laterally projecting teeth that are embedded in opposite sides of said bunch.

Signed by me at Boston, Massachusetts, this 20th day of May, 1926.

TOBE C. DEUTSCHMANN.